(12) United States Patent
Kim et al.

(10) Patent No.: US 7,134,430 B2
(45) Date of Patent: Nov. 14, 2006

(54) CUTTING SEGMENT, METHOD OF MANUFACTURING CUTTING SEGMENT, AND CUTTING TOOL

(75) Inventors: Soo-Kwang Kim, Irvine, CA (US); Hee-Dong Park, Kyungki-do (KR)

(73) Assignees: Ehwa Diamond Industrial Co. Ltd., Osan (KR); General Tool, Inc., Irvine, CA (US)

( * ) Notice: Subject to any disclaimer, the term of this patent is extended or adjusted under 35 U.S.C. 154(b) by 0 days.

(21) Appl. No.: 11/010,195

(22) Filed: Dec. 9, 2004

(65) Prior Publication Data

US 2005/0235978 A1 Oct. 27, 2005

(51) Int. Cl.
*B28D 1/12* (2006.01)
*B23F 21/03* (2006.01)

(52) U.S. Cl. .................. 125/22; 125/15; 451/544

(58) Field of Classification Search ........... 125/21, 125/22, 15, 13.01, 16.01, 18; 451/533, 534, 451/540, 542, 548; 51/295, 307, 309; 175/434, 175/435, 420.2

See application file for complete search history.

(56) References Cited

U.S. PATENT DOCUMENTS 6,626,167 B1 * 9/2003 Kim et al. ............... 125/15
2003/0084894 A1 * 5/2003 Sung ........................ 125/12

* cited by examiner

*Primary Examiner*—Dung Van Nguyen
(74) *Attorney, Agent, or Firm*—Birch, Stewart, Kolasch & Birch, LL

(57) ABSTRACT

A cutting segment for a cutting tool used for cutting or drilling a brittle workpiece, such as stone, brick, concrete and asphalt, a method of manufacturing the segment and a cutting tool provided with the segment are disclosed. The segment comprises a plurality of plate-shaped metal matrix layers laminated perpendicular to a cutting surface of the segment while being parallel to a cutting direction of the segment, the plate-shaped metal matrix layers being integrally combined with each other and made of a ferrous or non-ferrous material; and diamond particle layers arranged between the plate-shaped metal matrix layers such that diamond particles can be provided in an array on the cutting surface. The segment has an excellent cutting capability, and can be made by a simplified manufacturing process, thereby remarkably reducing manufacturing costs.

18 Claims, 13 Drawing Sheets

CUTTING SEGMENT, METHOD OF MANUFACTURING CUTTING SEGMENT, AND CUTTING TOOL

BACKGROUND OF THE INVENTION

1. Field of the Invention

The present invention relates to a cutting segment for a cutting tool used for cutting or drilling brittle workpieces, such as stone, brick, concrete and asphalt; a method of manufacturing the segment; and a cutting tool comprising the segment. More particularly, the present invention relates to a cutting segment for a cutting tool, which uses a plate-shaped metal matrix instead of a powdered metal matrix, a method of manufacturing the segment, and a cutting tool comprising the segment.

2. Description of the Related Art

In order to cut or dill brittle workpieces, such as stone, brick, concrete and asphalt, it is necessary to provide an abrasive material having hardness higher than that of the workpieces.

Synthetic diamond particles, natural diamond particles, nitrogen boride and cemented carbide are well known in the art as abrasive materials, and particularly, synthetic diamond particles have been most widely used in the art of cutting tools among these materials.

Synthetic diamond (referred to as "diamond" hereinafter) was invented in the 1950's, and is known as a material having a higher hardness than any other material on earth. Due to this property, the diamond is used for a cutting tool, a grinding tool and the like.

Particularly, the diamond has been widely used in the field of stone machining when cutting or grinding a variety of stones, such as marble, granite and the like, and in the field of construction when cutting or grinding concrete structures.

A cutting segment (also referred to as "segment" hereinafter) comprising diamond particles as the abrasive material, and a cutting tool comprising the same will now be described.

Typically, a segment type diamond tool comprises a plurality of segments, each having the diamond particles distributed thereon, and a steel core holding the segment.

FIG. 1 shows an example of the segment type diamond tool.

Referring to FIG. 1, the segment type diamond tool comprises a plurality of segments 11 and 12 fixed to a disk-shaped steel core 2 and having diamond particles 5 randomly distributed in each of the segments 11 and 12.

The segments are manufactured according to powder metallurgy, in which the diamond particles are mixed with metal powders acting as a matrix, and are then compacted and sintered.

As mentioned above, when the diamond particles are mixed with the metal powders, the diamond particles are not uniformly distributed among the metal powders, resulting in a decrease in cutting efficiency of the diamond particles and reduction in life span.

That is, when mixing the diamond particles and the metal powders acting as the matrix, differences in sizes and specific gravities between the particles cause segregation of the diamond particles, thereby generating non-uniform distribution of the diamond particles among the metal powders. As a result, as shown in FIG. 1, a cutting surface 3 in each segment with an excessively large amount of diamond particles distributed thereon or a cutting surface 4 with an excessively small amount of diamond particles distributed thereon can be formed.

When the diamond particles are segregated as described above, not only is the cutting efficiency of the cutting tool deteriorated, but the life span of the cutting tool is also reduced.

As a technology for solving the above problems caused by the segregation of the diamond particles, a patterning technology, which distributes the diamond particles in a predetermined pattern, has been suggested and an example thereof is illustrated in FIG. 2.

FIG. 2 shows another example of a segment type diamond tool 20 in which the diamond particles are distributed in the predetermined pattern.

Referring to FIG. 2, each of the segments 21 and 22 has the diamond particles 5 distributed thereon in the predetermined pattern. That is, the diamond particles 5 are uniformly distributed in each of the segments 21 and 22.

According to the patterning technology, instead of mixing the metal powders and the diamond particles, the metal powders and the diamond particles are arranged in layers by repeating a process for arranging the diamond particles on the metal powder matrix in a predetermined, non-random pattern and a process for positioning the metal powder matrix on the diamond particles. The layered products are then compacted into a predetermined compact, followed by sintering, thereby providing the segment.

Although the patterning technology for the diamond particles can solve the problems caused by segregation of the diamond particles, intrinsic problems caused by the use of the powdered metal matrix cannot be solved.

That is, when manufacturing the segment, if metal powders are used for the matrix, the metal powders are subjected to a higher pressure during a process of compacting the metal matrix. During the process of compacting the metal matrix, due to severe wear of compaction die by the diamond particles, there frequently occurs a variation in thickness of the matrix or a breakage of the matrix, thereby lowering productivity. Furthermore, in severe cases, dimensions of the matrix are changed, so that the segments have different dimensions, respectively, resulting in performance variation and deterioration of the diamond tool.

Further, even though the metal powders for the matrix can be manufactured by various methods using the same components, manufacturing costs of the metal powders are remarkably high compared with a bulk of metal, such as plate, coil, rod, and the like.

Additionally, when manufacturing the segments through powder metallurgy, a process for mixing the diamond particles and the metal powders, a process for compacting the mixture of the diamond particles and the metal powders into a predetermined compact, and a process for sintering the compact must be sequentially preformed, complicating the manufacturing processes.

SUMMARY OF THE INVENTION

The present invention has been made to solve the above problems, and it is an object of the present invention to provide a cutting segment, which uses a metal plate instead of a powdered metal as a matrix, thereby realizing an excellent cutting capability, a simplified manufacturing process and remarkably reduced manufacturing costs.

It is another object of the present invention to provide a method of manufacturing the segment as described above.

It is yet another object of the present invention to provide a cutting tool comprising the segments as described above.

In accordance with one aspect of the present invention, the above and other objects can be accomplished by the provision of a cutting segment, comprising: a plurality of plate-shaped metal matrix layers laminated perpendicular to a cutting surface of the segment while being parallel to a cutting direction of the segment, the plate-shaped metal matrix layers being integrally combined with each other and made of a ferrous or non-ferrous material; and diamond particle layers arranged between the plate-shaped metal matrix layers such that diamond particles can be provided in an array on the cutting surface.

In accordance with another aspect of the present invention, there is provided a cutting segment, comprising: a plurality of layers, each comprising a plate-shaped sintered layer and a plate-shaped metal matrix layer made of a ferrous or non-ferrous material, the plate-shaped sintered layer and the plate-shaped metal matrix layer being alternately laminated in each of the layers such that the plate-shaped sintered layer and the plate-shaped metal matrix layer are laminated perpendicular to a cutting surface of the segment while being parallel to a cutting direction of the segment; and diamond particle layers arranged in the segment, such that at least a portion of the diamond particles can be positioned in the plate-shaped sintered layer and the rest of the diamond particles can be positioned in the plate-shaped metal matrix layer, while being provided in an array of the diamond particles on the cutting surface.

In accordance with still another aspect of the present invention, there is provided a cutting tool comprising cutting segments.

In accordance with still another aspect of the present invention, there is provided a method of manufacturing a cutting segment, comprising the steps of: a) preparing plate-shaped metal matrices made of a ferrous or non-ferrous material; b) arranging diamond particle layer on one of the plate-shaped metal matrices; c) laminating another metal matrix on the diamond particle layer; d) arranging the diamond particle layer on the other metal matrix; e) preparing a laminate having a predetermined thickness by repeating the steps a) to d); and f) heating and pressing the laminate such that components constituting the laminate are combined with each other.

In accordance with still another aspect of the present invention, there is provided a method of manufacturing a cutting segment, comprising the steps of: a) preparing a metal preform manufactured by powder casting; b) arranging diamond particle layer on the metal preform; c) laminating a plate-shaped metal matrix made of a ferrous or non-ferrous material on the diamond particle layer; d) preparing a laminate having a predetermined thickness by repeating the steps a) to c); and e) heating and pressing the laminate such that components constituting the laminate are combined with each other.

In accordance with still another aspect of the present invention, there is provided a method of manufacturing a cutting segment, comprising the steps of: a) preparing metal preforms; b) arranging diamond particle layer on one of the metal preforms; c) laminating another metal preform on the diamond particle layer; d) laminating a plate-shaped metal matrix made of a ferrous or non-ferrous material on the other metal preform; e) preparing a laminate having a predetermined thickness by repeating the steps a) to d); and e) heating and pressing the laminate such that components constituting the laminate are combined with each other.

It is yet another aspect of the present invention to provide a cutting tool comprising the segments manufactured by the above methods.

BRIEF DESCRIPTION OF THE DRAWINGS

The above and other objects, features and other advantages of the present invention will be more clearly understood from the following detailed description taken in conjunction with the accompanying drawings.

DESCRIPTION OF THE PREFERRED EMBODIMENTS

Figure 1:
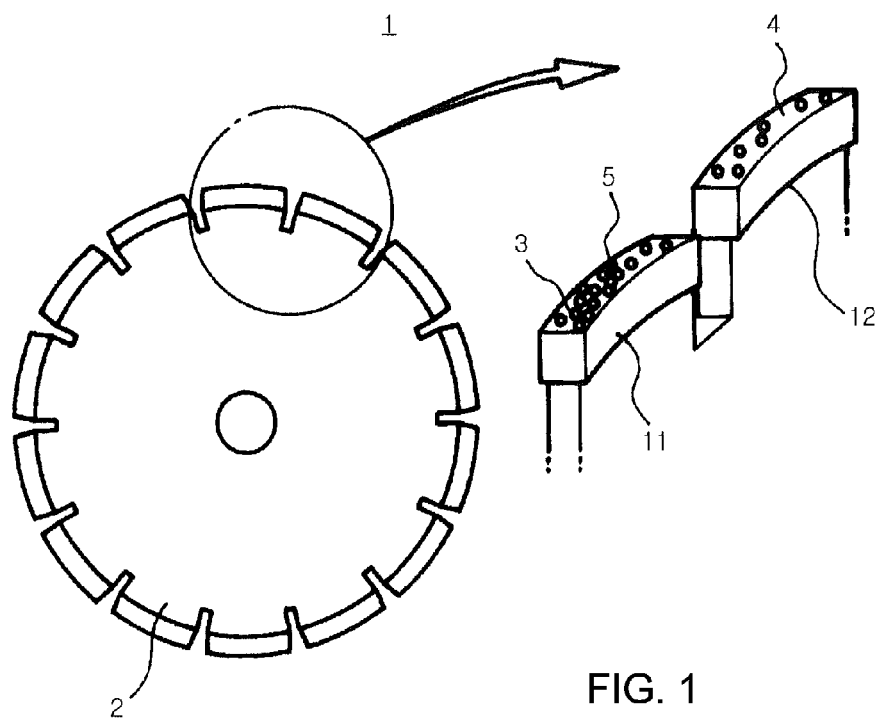
FIG. 1 is a diagram illustrating an example of a diamond tool with diamond particles randomly distributed on a cutting surface of a segment.
Figure 2:
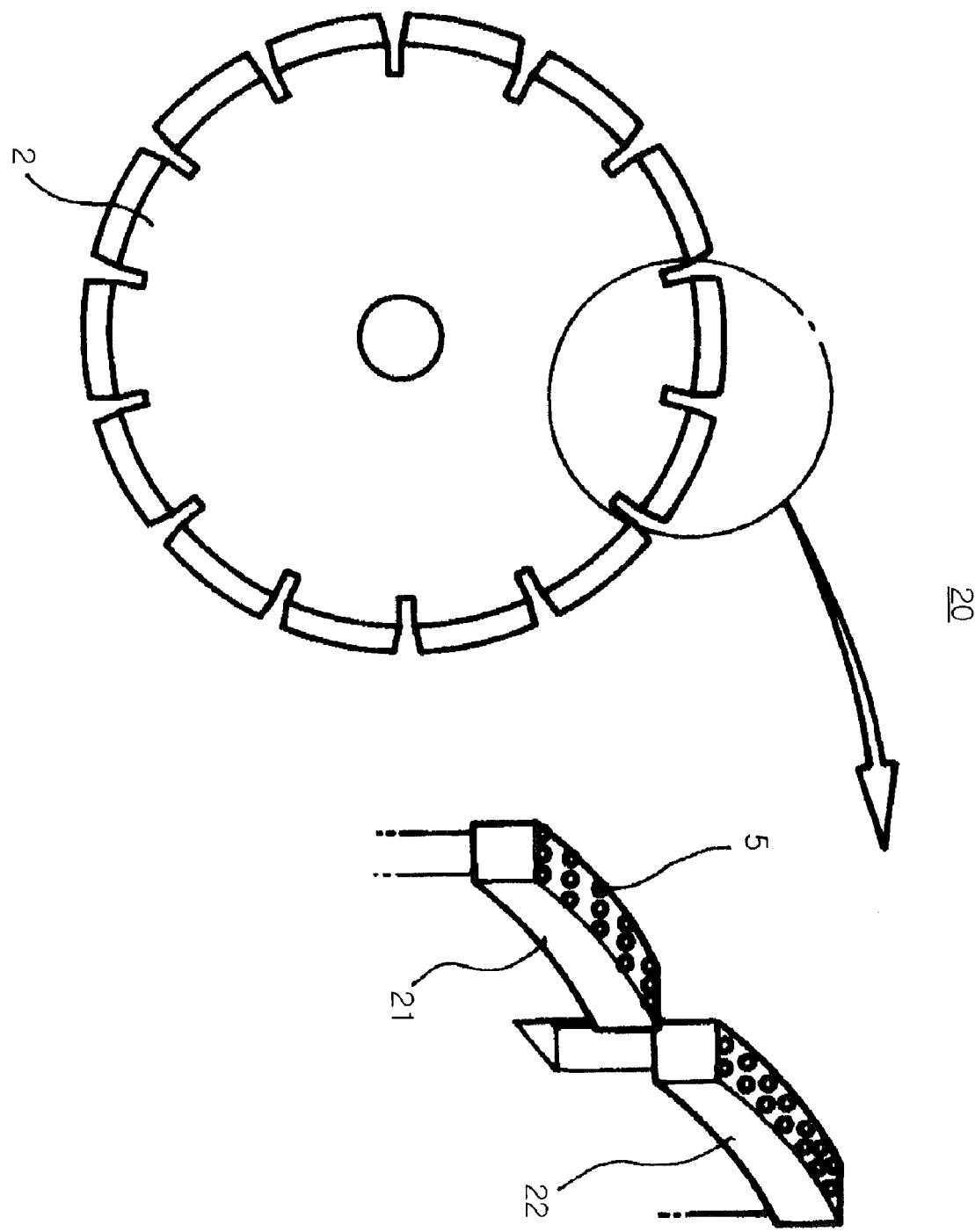
FIG. 2 is a diagram illustrating an example of a diamond tool with the diamond particles uniformly distributed on the cutting surface of the segment.

The present invention will now be described in detail.

The present invention can be applied to a segment for a cutting tool used for cutting or drilling brittle workpieces, such as stone, brick, concrete and asphalt, and a cutting tool comprising the segments.

The segment for the cutting tool comprises diamond particles directly performing a cutting operation when cutting the workpieces, and metal matrices holding the diamond particles.

Conventionally, powdered metal matrices have been used when manufacturing the segment.

When manufacturing the segment using the powdered metal matrix, there are problems in that the diamond particles are segregated, reducing not only cutting efficiency of the cutting tool, but also life span thereof.

Further, when manufacturing the segment using the powdered metal matrix, a process for mixing the diamond particles and the metal powders, a process for compacting the mixture of the diamond particles and the powders into a predetermined compact, and a process for sintering the compact must be sequentially carried out.

Thus, when manufacturing the segment using a powdered metal matrix, there are problems in that the manufacturing processes are complicated, and in that manufacturing costs are increased.

As a technology for solving the above problems caused by segregation of the diamond particles, a patterning technology, which distributes the diamond particles in a predetermined, non-random pattern, has been suggested.

According to the patterning technology (instead of mixing the metal powders and the diamond particles) repeated layers of metal powders and diamond particles are prepared by repeating a processes of arranging the diamond particles on a metal powder matrix in a predetermined, non-random pattern, placing metal powder matrix on the diamond particles, compacting the layers into a predetermined compact, and then sintering the layered product, thereby producing the segment.

Although this patterning technology can solve some problems caused by the segregation of the diamond particles, the problems of complicated manufacturing process and increase in manufacturing costs caused by use of the powdered metal matrix are not solved.

A given segment having diamond particles distributed thereon in the predetermined pattern can be roughly divided into (1) a first portion of the metal matrix with the diamond particles arranged thereon, and (2) a second portion of the metal matrix not arranged with the diamond particles.

The subject matter of the present invention is directed to forming the second portion of the metal matrix (i.e. that portion not having diamond particles arranged thereon), by using a plate-shaped metal matrix from the beginning of the process instead of the powdered metal matrix.

If the segment is manufactured using the plate-shaped metal matrix from the beginning of the process, not only are the diamond particles distributed without the segregation as is desired, but also the manufacturing process can be simplified and the manufacturing costs can be minimized.

The present invention will now be described in detail with reference to the drawings.

Figure 3:
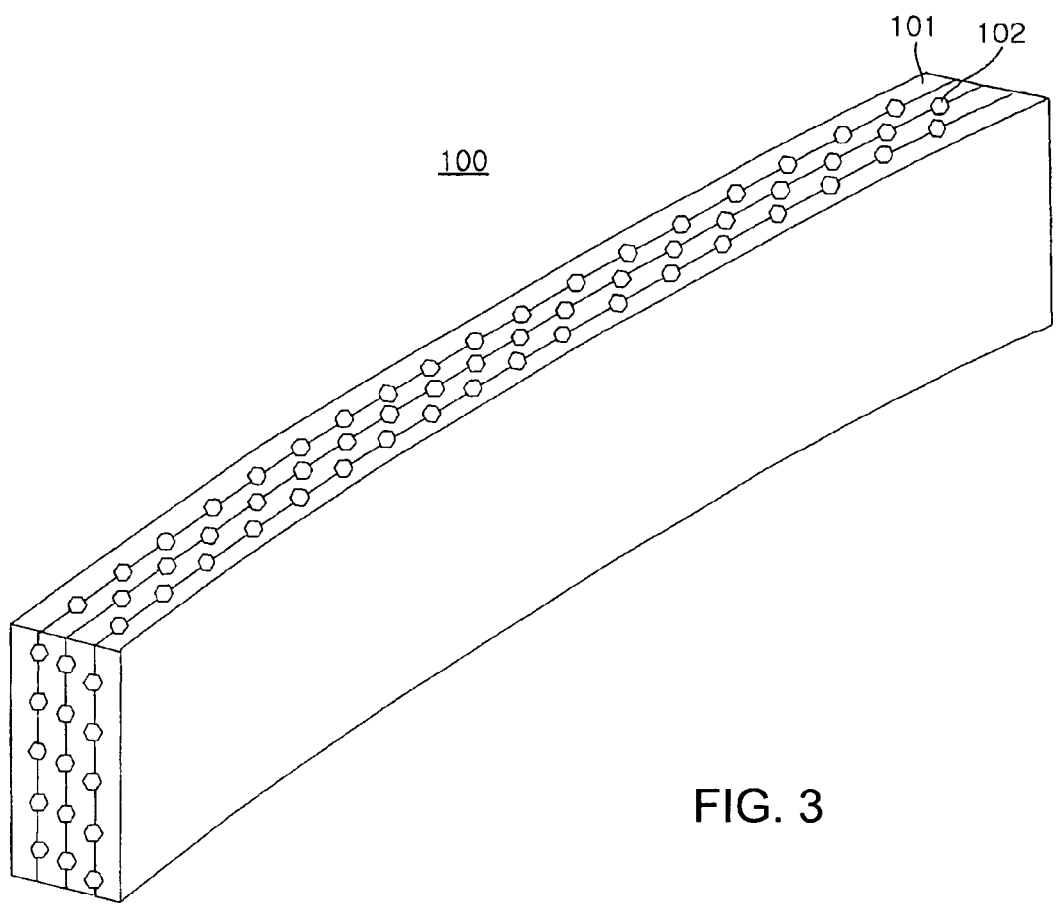
FIG. 3 is a diagram illustrating an example of a cutting segment according to the present invention.

FIG. 3 is a diagram illustrating an example of a cutting segment according to the present invention.

Referring to FIG. 3, a cutting segment 100 according to the present invention comprises a plurality of plate-shaped metal matrix layers 101 laminated perpendicular to a cutting surface of the segment and parallel to a cutting direction of the segment, and diamond particle layers 102 arranged between the metal matrix layers 101 such that diamond particles can be provided in an array on the cutting surface.

Figure 4:
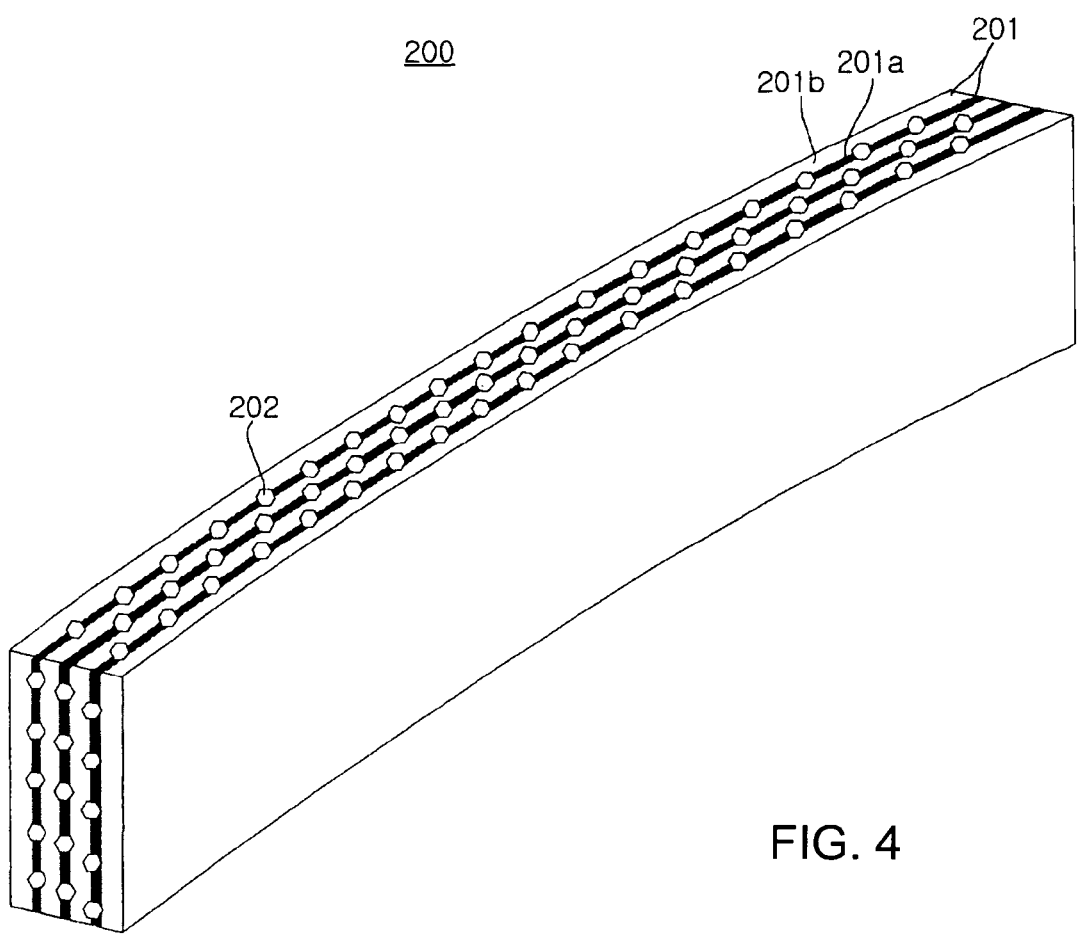
FIG. 4 is a diagram illustrating another example of the segment according to the present invention.

FIG. 4 is a diagram illustrating another example of the segment according to the present invention.

As shown in FIG. 4, a cutting segment 200 according to the present invention comprises a plurality of layers 201, each of which comprises a plate-shaped sintered layer 201a and a plate-shaped metal matrix layer 201b.

The plurality of layers 201 are laminated in the segment such that the plate-shaped sintered layer 201a and the plate-shaped metal matrix layer 201b are alternately arranged in the segment.

The plate-shaped sintered layer 201a and the plate-shaped metal matrix layer 201b are laminated perpendicular to the cutting surface of the segment and parallel to the cutting direction of the segment.

Diamond particle layers 202 are arranged such that at least a portion of the diamond particles 202 is positioned in the plate-shaped sintered layer 201a and the rest of the diamond particles 202 are positioned in the plate-shaped metal matrix layer 201b.

The diamond particle layers 202 are arranged such that the diamond particle layers 202 are provided as an array of diamond particles on the cutting surface.

The plate-shaped metal matrix layers 101 and 201b are preferably made of a ferrous or non-ferrous material, and more preferably of steel. Representative examples of the non-ferrous material are Co, Ni, Cu, Sn, Al, W, etc.

According to the present invention, the plate-shaped metal matrix layer is made of a rolled material, a sintered material, or a powder compact. Preferably, the plate-shaped metal matrix layers are made of the rolled material, or made of the rolled material together with some portion of the sintered material. Furthermore, the plate-shaped metal matrix layers may be made of the rolled material together with some portion of the powder compact, or made of the rolled material together with some portion of the sintered material and the powder compact. Furthermore, the plate-shaped metal matrix layers may be made of sintered material, or made of sintered material together with some portion of powder compact. Most preferably, the plate-shaped metal matrix layers are made of the rolled material.

The rolled material may be, for example, a hot rolled steel plate or a cold rolled steel plate.

Typically, when sintering the powders and the powder compact together with the diamond particles, the sintering temperature is 1,000° C. or less. Accordingly, in the case where the plate-shaped metal matrix layers are made of the powder compact, since the sintering temperature is 1,000° C. or less, there is a restriction in selection of the powder compact. However, in the case where the plate-shaped metal matrix layers are made of the rolled material or the sintered material, there is no restriction in selection of the material according to the sintering temperature.

In the segment of the invention, the thickness of the plate-shaped metal matrix layer can be varied depending on the size of the diamond particle, and preferably, the thickness of the plate-shaped metal layer is at maximum twice the thickness of the diamond particle layer.

Meanwhile, when the plate-shaped sintered layer 201a is prepared, the total thickness of the plate-shaped sintered layer 201a and of the plate-shaped metal matrix layer is preferably limited such that the total thickness is not more than at least two times the average diameter of the diamond particles.

Figure 5:
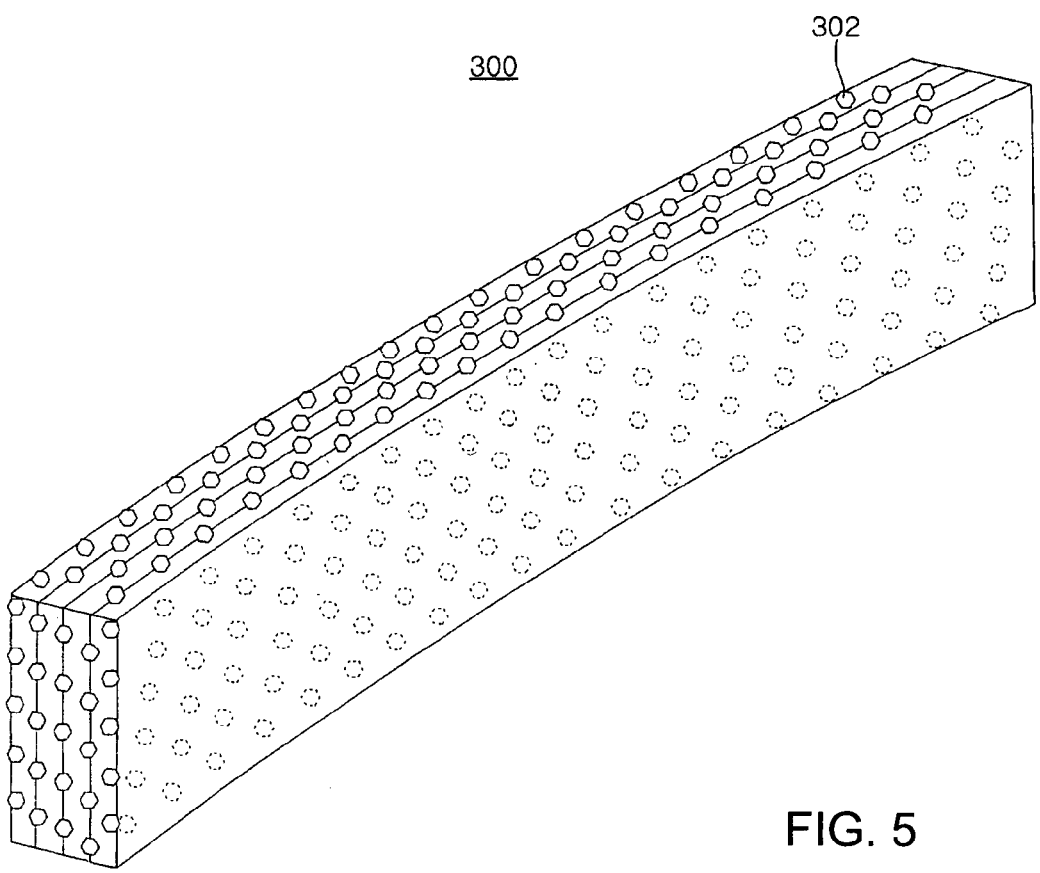
FIG. 5 is a diagram illustrating still another example of the segment according to the present invention.
Figure 6:
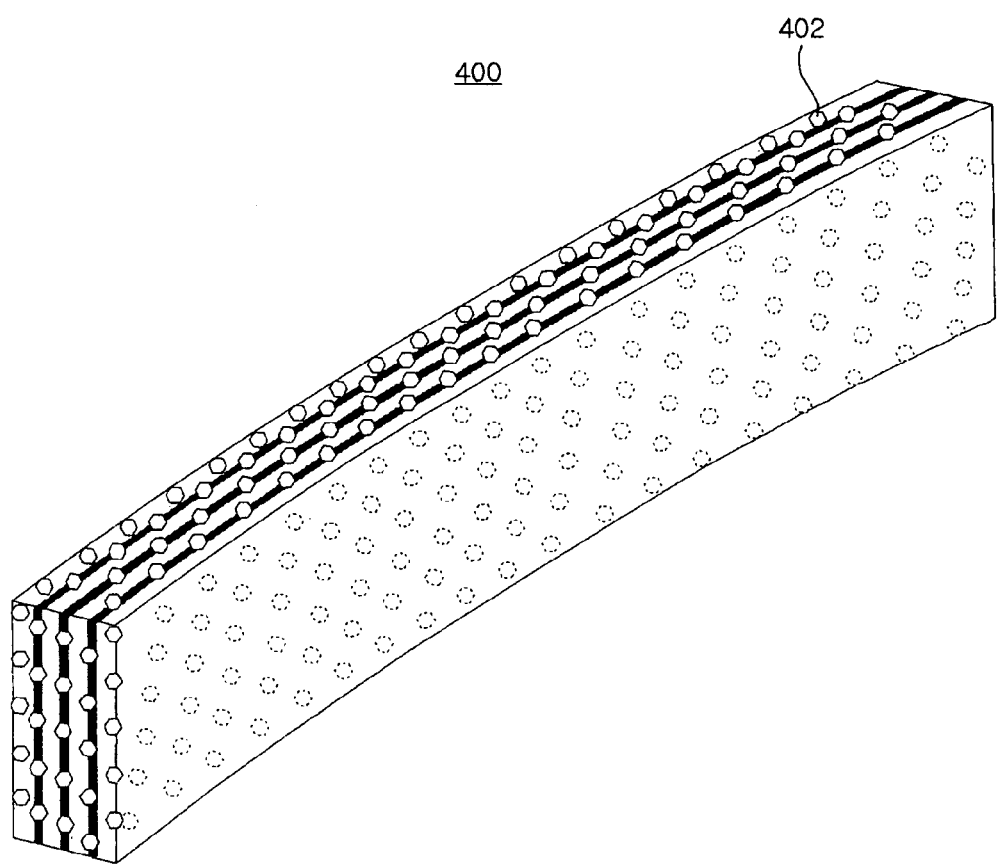
FIG. 6 is a diagram illustrating still another example of the segment according to the present invention.
Figure 7:
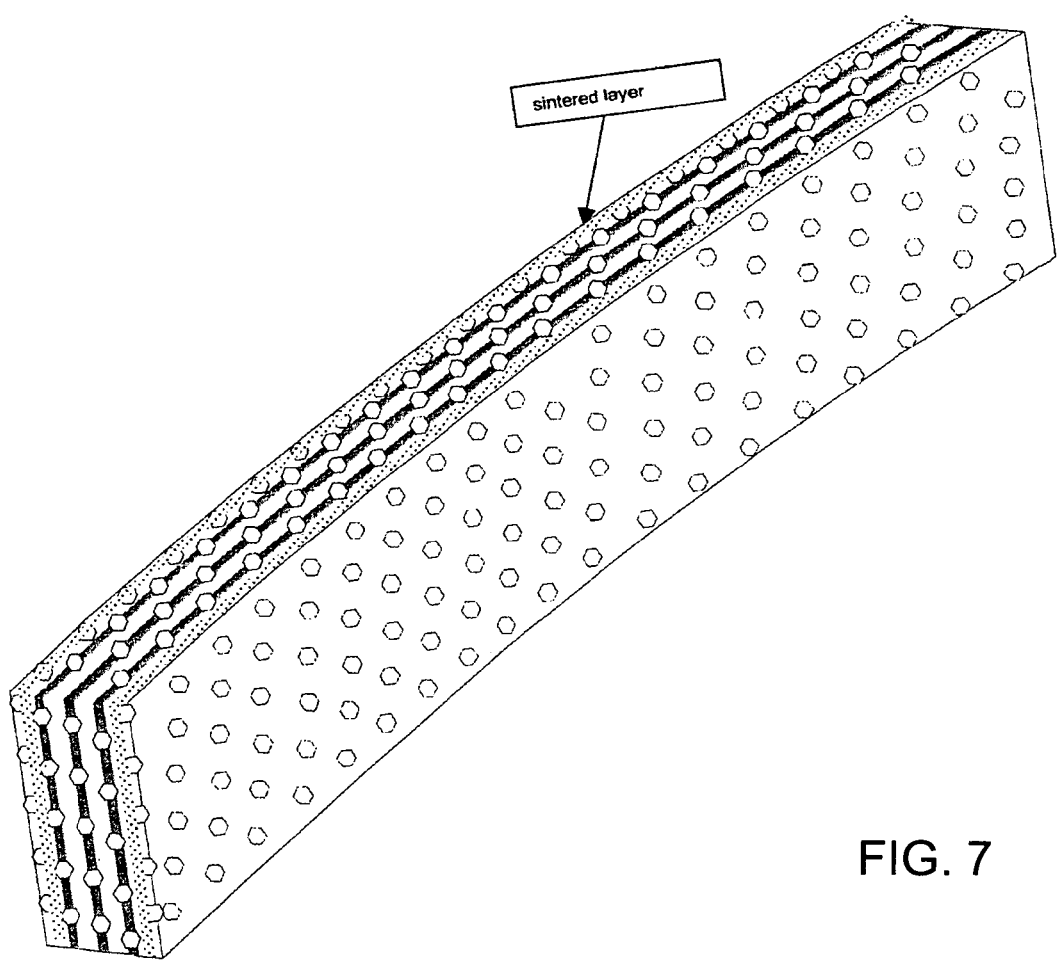
FIG. 7 is a diagram illustrating yet another example of the segment according to the present invention.

Further, as shown in FIGS. 5, 6, and 7, the present invention comprises cutting segments 300 and 400, in which diamond particle layers 302, 402 and 802 are arranged on the outer surface.

A method of manufacturing the segment according to the present invention will now be described.

The diamond tool according to the present invention may have segments or portions, which consist of a leading segment with n layers of diamond particles arranged thereon, and a trailing segment with n' layers of diamond particles (where $n' \leq n$) arranged therein. Here, the leading segment and the trailing segment are alternately arranged such that the layers of diamond particles of the trailing segment are arranged between the layers of diamond particles of the leading segment in the cutting direction. Furthermore, the leading segments and the trailing segments can be alternately arranged such that the diamond particles on the trailing segment pass along the lands between grooves previously formed on the workpiece by the diamond particles on the leading segment, thereby completely removing the lands from the workpiece.

The present invention may be applied to the diamond tool having segments, each of which is divided into two or more sections with n layers of diamond particles arranged on a leading section in the cutting direction, and with n' layers of diamond particles arranged on a trailing section in the cutting direction (where $n' \leq n$), such that the layers of diamond particles of the leading section are arranged between the layers of diamond particles of the trailing section in the cutting direction, respectively. In this case, the layers of diamond particles may be alternately arranged at a predetermined space, by alternately forming depressed portions to a predetermined depth at both sides of the segment with the n layers of diamond particles arranged thereon. In the segments formed with the depressed portions, the layers of diamond particles on the trailing section must be arranged between the layers of diamond particles on the leading section in the cutting direction.

FIGS. 11A to 11E show examples of the segment divided into two or more sections, which may be applied to the present invention.

Figure 11A:
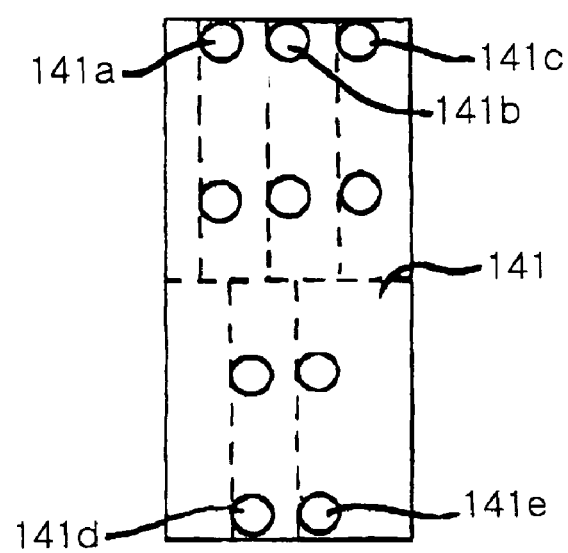
FIGS. 11A–11D are views illustrating segments according to the invention with depressed portions found thereon.

Specifically, FIG. 11A shows a segment divided into two sections with three layers of diamond particles arranged on the leading section in the cutting direction, and with two layers of diamond particles arranged on the trailing section. As shown in FIG. 11A, the layers of diamond particles 141d and 141e of the trailing section are arranged between the layers of diamond particles 141a, 141b and 141c of the leading section in the cutting direction.

Figures 11B, 11C:
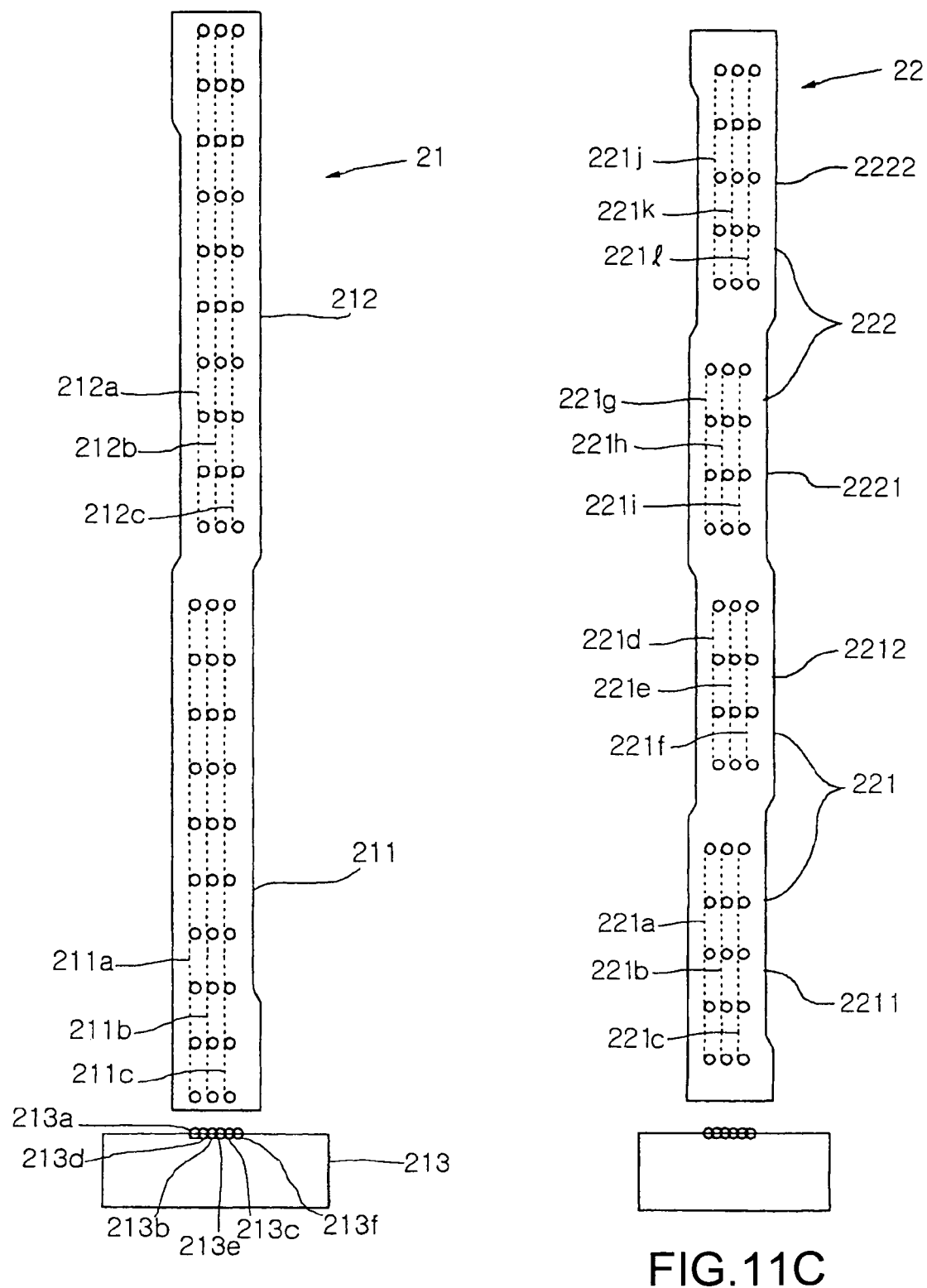

FIG. 11B shows a segment 21 having a leading section 211 and a trailing section 212, on which the depressed portions are alternately formed at both sides of the front or trailing section in the cutting direction. As shown in FIG. 11B, the segment 21 has the leading section 211 with three layers 211a, 211b and 211c of diamond particles arranged thereon, and the trailing section 212 with three layers 212a, 212b and 212c of diamond particles arranged thereon, such that the three layers 211a, 211b and 211c of diamond particles on the leading section 211 are arranged between the three layers 212a, 212b and 212c of the diamond particles on the trailing section 212, respectively, in the cutting direction.

FIG. 11C show a segment 22 having two or more (a plurality of) sub-sections with the depressed portions alternatively formed at both sides (at the side in the cutting direction) of the segment, such that the depressed portions may be repetitiously formed on the segment, so that the layers of diamond particles may be alternatively arranged therein. As shown in FIG. 11C, the segment 21 has the leading section 221, which is comprised of a leading sub-section 2211 with three layers 221a, 221b and 221c of diamond particles arranged thereon and a trailing sub-section 2212 with three layers 221d, 221e and 221f of diamond particles arranged thereon, and the trailing section 222, which is comprised of a leading sub-section 2221' with three layers 221g, 221h and 221i of diamond particles arranged thereon and a trailing sub-section 2222' with three layers 221j, 221k and 221l of diamond particles arranged thereon. Here, the three layers 221a, 221b and 221c of diamond particles may be arranged between the three layers 221d, 221e and 221f of the diamond particles, respectively, in the cutting direction, while the three layers 221g, 221h and 221i of diamond particles may be arranged between the three layers 211j, 211k and 211l of diamond particles, respectively, in the cutting direction.

Figure 11D:
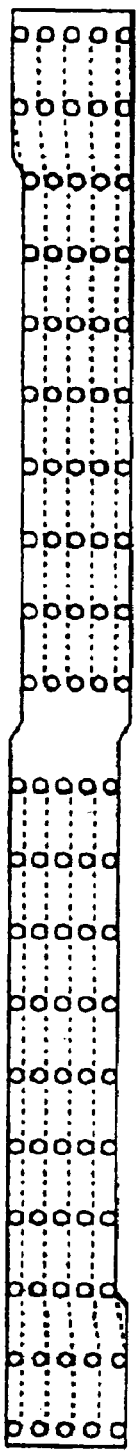
Figure 11D:
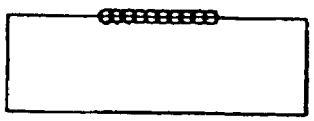
Figure 11E:
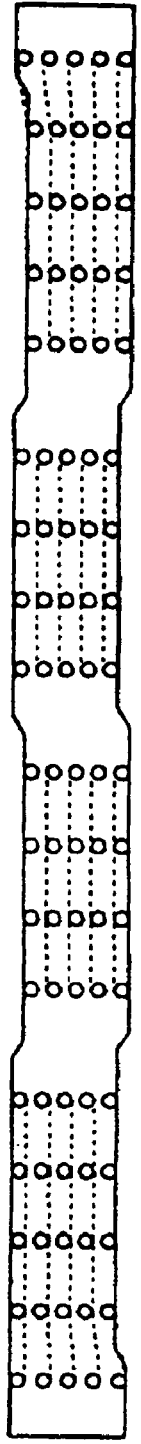
Figure 11E:

FIGS. 11D and 11E show examples of the segment with the diamond particles arranged to adjoin lateral sides of the segment.

A depth of the portion formed with the depressed portions, a length of the portion formed with the depressed portions, and the number of depressed portions may be appropriately varied according to size of the segment, concentration of the diamond particles, and size of the diamond particles. Furthermore, the diamond tool according to the present invention may be alternately disposed with segments having the n layers of diamond particles arranged thereon, and with other segments having n−1 layers of diamond particles arranged thereon. The layers of diamond particles in each of the segments with the n−1 layers of diamond particles arranged thereon are arranged between the layers of diamond particles in each of the segments with the n layers of diamond particles in the cutting direction, respectively.

The present invention is characterized in that, in the diamond tool with the diamond particles arranged as described above, the diamond particles are arranged at a predetermined tilt angle to a line connecting upper vertices or a line connecting lower vertices of a cross section, cut parallel in the cutting direction and perpendicular to the cutting surface, such that when cutting the workpiece with the diamond particles, the diamond particles are protruded and uniformly spaced from each other on the cutting surface of the segment.

The Step of Preparing Plate-shaped Metal Matrices

In order to manufacture a cutting segment according to the present invention, plate-shaped metal matrices made of a ferrous or non-ferrous material are prepared. The plate-shaped metal matrix is preferably made of steel. The plate-shaped metal matrices are prepared to have an adequate shape corresponding to the segment to be manufactured.

In the present invention, the plate-shaped metal matrix is preferably made of a rolled material, a sintered material, or powder compact, and most preferably of the rolled material.

The rolled material may be a hot rolled material or a cold rolled material.

When using a rolled material as the plate-shaped metal matrix, the rolled material has a density near to a theoretical density limit. Accordingly, the segment using the rolled material as the metal matrix exhibits excellent mechanical properties, as compared with the segment produced by compacting and sintering a powdered metal matrix.

Table 1 below shows results of an experiment, wherein bending strengths of the metal matrix made of SK85 steel plate having a thickness of 0.5 mm, and of the metal matrix made of Co powders were measured.

In Table 1, Inventive material 1 is a sample provided by laminating several SK85 steel plates, each having a thickness of 0.5 mm, followed by pressing and sintering. Inventive material 2 is a sample produced by alternately laminating SK85 steel plates and preforms made of 100% Co, followed by pressing and sintering. Conventional material 1 is a sample produced by pressing and sintering the metal matrix made of 100% Co powders.

TABLE 1

| Sample No. | Bending strength (Kg/mm$^2$) |
| --- | --- |
| Inventive material 1 | 246 |
| Inventive material 2 | 199 |
| Conventional material 1 | 150 |

As shown in Table 1, when using the plate-shaped rolled material as the metal matrix, the bending strength of Inventive materials 1 and 2 are remarkably higher than that of Conventional material 1 using 100% Co powder, which is known as having the highest bending strength among the powders used for the segment.

As for the plate-shaped metal matrix, including the steel, binders having various shapes and mechanical properties, such as aluminum alloys, nickel alloys, copper alloys, brass, and the like, can be used.

The Steps of Arranging Diamond Particles and Laminating Another Plate-shaped Metal Matrix The diamond particles are arranged on one of the plate-shaped metal matrices in a manner as described above. The following is an example of arranging the diamond particles.

First, a spray type adhesive is applied onto a metal net cut to have the shape of the segment, and a metal jig punctured to have holes uniformly spaced from each other by a laser is then placed on the spray type adhesives. Then, fine diamond particles are scattered thereon. At this time, scattering of the fine diamond particles is performed such that each of the holes formed on the metal jig must receive one diamond particle. By separating the metal jig therefrom, the metal net with the diamond particles uniformly arranged thereon is obtained. The diamond particles can be arranged on the plate-shaped metal matrix by placing the metal net, having the diamond particles uniformly arranged thereon as described above, on one of the plate-shaped metal matrices.

As a different method of arranging the diamond particles, there can be suggested a method of arranging the diamond particles using a tape having an adhesive property. Then, another plate-shaped metal matrix is laminated on the diamond particle layer positioned on the plate-shaped metal matrix. A plurality of plate-shaped metal matrices is laminated as described above until a laminate having a predetermined thickness is produced.

That is, when using the metal net as described above, the plate-shaped metal matrix, the metal net with the diamond particles arranged thereon, and the plate-shaped metal matrix are repetitiously laminated in this order until the segment of a predetermined thickness is obtained.

Preferably, the diamond particles are surrounded with powder compact layers by inserting the powder compact layers between the plate-shaped metal matrices. When the diamond particles are surrounded with the powder compact layers, the diamonds can be prevented from being damaged during heating of the segment. Additionally, several kinds of powder compact can be used, so that the segments of the diamond tool can be manufactured according to an application of the cutting tool by changing abrasiveness of the segment. Furthermore, the powder compact layers between the matrices act to protect the diamond particles in a conductive-type heating and pressing method (hot press sintering). The powder compact layers are preferably inserted in the form of plate-shaped metal preforms.

Each of the metal preforms can be manufactured through a tape casting method and the like. The metal preform preferably contains about 10~40 wt % binders. The metal preforms can be inserted as layers of the metal preforms. The thickness of a single metal preform can be varied depending on the amount of the binders added thereto. This is attributed to the fact that as long as the metal preform has a sufficient thickness, the metal preform can act to protect the diamond particles.

In order to change abrasiveness by changing components of metal powders constituting the metal preform, the metal preform must have a large thickness after sintering. However, even in this case, the thickness of the metal preform after sintering is preferably lower than the average diameter of the diamond particles.

The metal preform comprises organic compounds or non-organic compounds and mixed together with metal powders, and can further comprise the diamond particles and a filler (which is an abrasive material having a high hardness).

As described above, when using the metal preforms, the segment can be manufactured with the plate-shaped metal matrices and the metal preforms, and thus it is not necessary to carry out processes for mixing the metal powders, granulating and forming. Accordingly, the segment can be more easily manufactured, compared with the conventional methods.

The plate-shaped metal preforms can be positioned at both upper and lower portions of the diamond particle layer or either the upper portion or the lower portion thereof.

Figure 8:
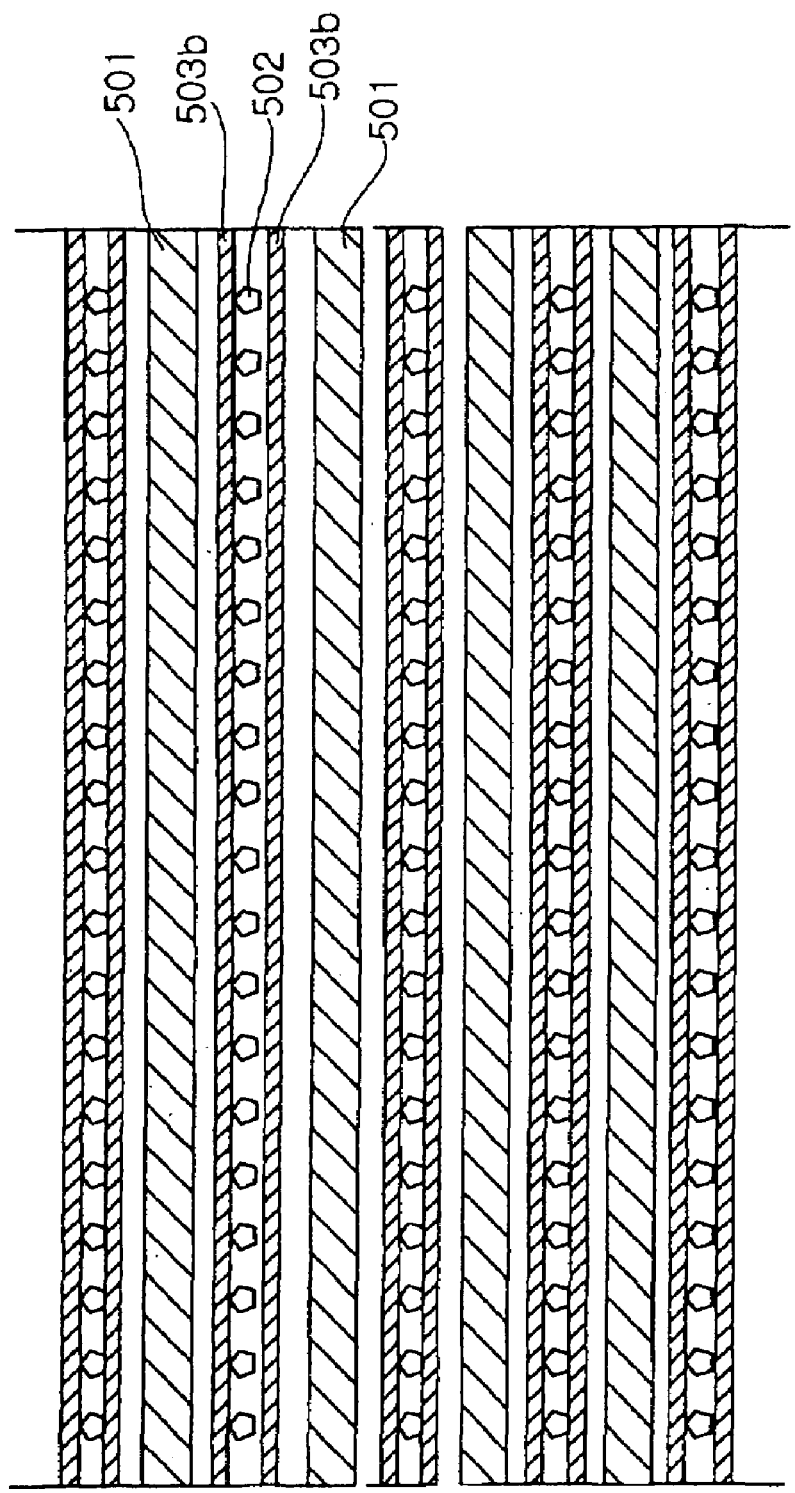
FIG. 8 is a diagram illustrating one example of arrangement of components when manufacturing the segment according to the present invention.

FIG. 8 shows an example of the segment, in which the plate-shaped metal preforms are located at both the upper and lower portions of the diamond particle layer, and the rolled material is used as the plate-shaped metal matrix. As shown in FIG. 8, the metal preforms 503 are provided on upper and lower sides of the diamond particle layer 502. Further, the plate-shaped metal matrix layers 501 are provided on an upper side of the metal preform 503 positioned on the upper side of the diamond particle layer 502, and provided on a lower side of another metal preform 503 positioned under the lower side of the diamond particle layer 502, respectively.

Filler (which is the abrasive material having a high hardness) can be added to the metal preforms, thereby increasing wear resistance. Examples of filler include, a single particle or a composite of two or more particles having a high wear resistance, such as SiC, WC, BN, $Al_2O_3$.

Further, in the present invention, it is possible to use metal preforms containing the diamond particles.

A plurality of plate-shaped metal matrices and metal preforms are laminated as described above until a laminate having a predetermined thickness is prepared. That is, when using the metal net as described above, the plate-shaped metal matrices, the metal preforms, and the metal nets with the diamond particles arranged thereon are laminated in a repetitious sequence of a) the plate-shaped metal matrix, b) the metal preform, c) the metal net with the diamond particles arranged thereon, and d) the metal preform, until a segment has a predetermined thickness.

As described above, in the present invention, after the diamond particles are arranged on a single metal preform to constitute a diamond particle layer, the plate-shaped metal matrix can be directly laminated on the diamond particle layer, and in this case, when the metal net is used as described above, the plate-shaped metal matrices, the metal preforms and the metal nets with the diamond particles arranged thereon are laminated in the repetitious sequence of a) the plate-shaped metal matrix, b) the metal preform, and c) the metal net with the diamond particles arranged thereon, until a segment has a predetermined thickness.

Further, in the present invention, it is possible to use the metal preforms containing the diamond particles, and in this case, the plate-shaped metal matrices and the metal preforms are laminated in the repetitious sequence of the plate-shaped metal matrix and the metal preform.

Figure 9B:
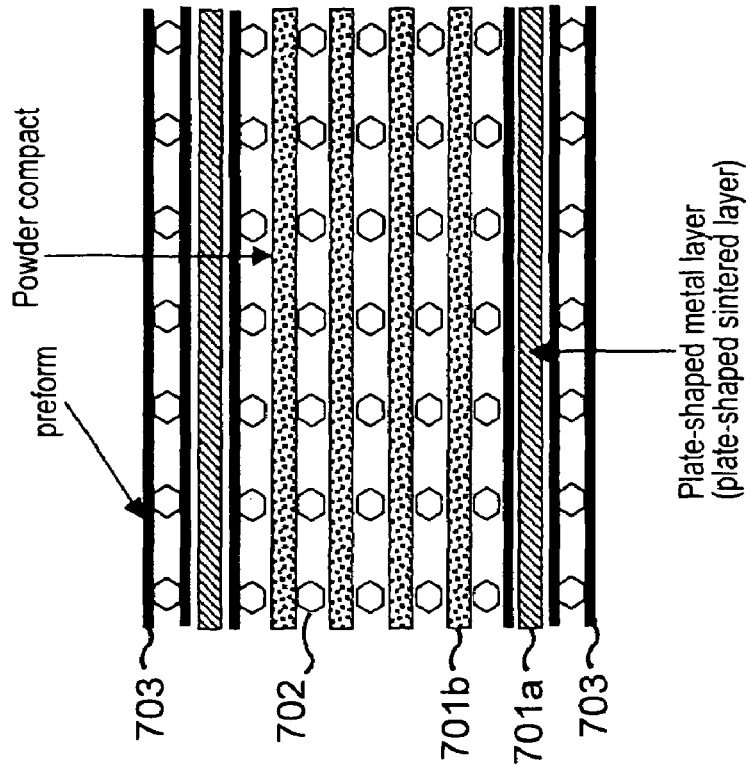
FIGS. 9a and 9b are diagrams illustrating other examples of arrangement of components when manufacturing the segment according to the present invention.
Figure 9A:
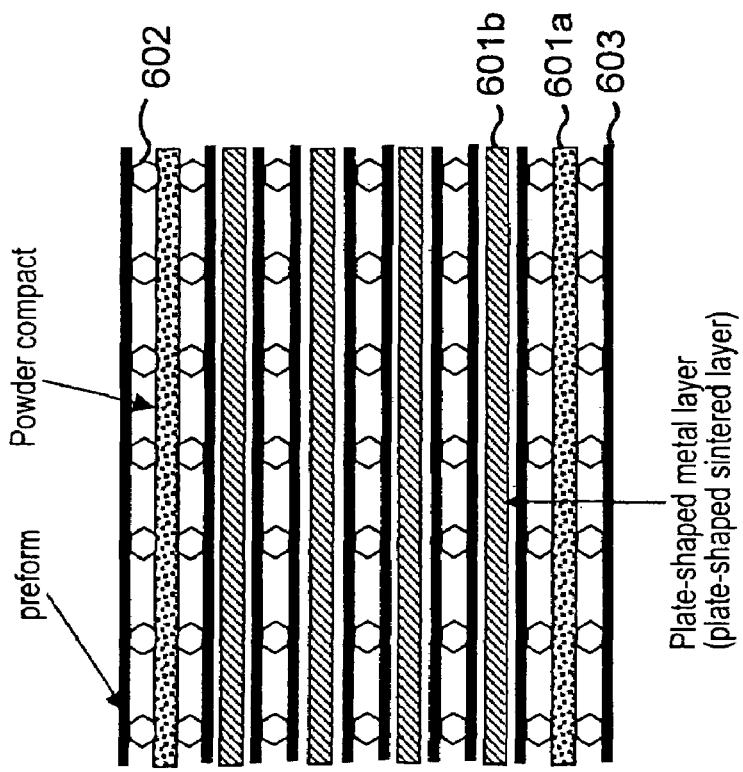

Referring to FIG. 9a showing one example of a segment 600 according to the present invention, in the arrangement of the components shown in FIG. 8, diamond particle layers 602 are positioned on upper and lower sintered layers 603 made of metal preforms, respectively. Then, upper and lower metal matrices 601a, each being a sintered layer made of a powder compact, are positioned on the diamond particle layers 602, respectively, and additional second diamond particle layers are positioned on the upper and lower metal matrices 601a, respectively. Subsequently, other sintered layers 603 made of metal preforms are positioned on the second diamond particle layers 602, respectively. In this example, each of the inner metal matrices 601b between the upper and lower metal matrices 601a is made of the rolled material, a sintered material or a combination of a rolled material and a sintered material.

Referring to FIG. 9b showing another example of a segment 700 according to the present invention, in the arrangement of the components shown in FIG. 8, upper and lower metal matrices 701a are surrounded with sintered layers 703 made of metal preforms, respectively, and inner metal matrices 701b between the upper and lower metal matrices 701a directly contact diamond particle layers 702, respectively. In this example, the upper and lower metal matrices 701a are made of a rolled material, a sintered material or a combination of rolled material and sintered material, and the inner metal matrices 701b are made of the powder compact.

It will be understood from the above that a cutting segment according to the invention comprises a plurality of diamond-containing layers, at least some of which are separated by a plate-shaped metal layer. The diamond-containing layers are each positioned between (1) two metal preforms, (2) two sintered metal matrices, or (3) a metal preform and a sintered metal matrix. The outermost layer/surface of each segment typically is comprised of a metal preform.

A metal preform is product known in the art to be comprised of metal powder, compacted in combination with a binder(s) and/or a filler(s). The sintered metal matrix layer is comprised of ferrous or non-ferrous metal, may be steel, including cold-rolled steel, and hot-rolled steel, but can also be forged metal (e.g. steel) layers.

In another embodiment, the segment may comprise crimped areas as shown in FIG. 11. According to this embodiment, the segment is prepared as described below, except that after the plurality of layers are positioned together, but before the final heating step, portions of the segment are crimped or pressed relative to other portions to create the final product as shown in FIG. 11, wherein first portions A of the segment are off-set from second portions B. This crimped off-set configuration results in an arrangement of the diamond layers whereby horizontal layers of diamonds in the first portion A are vertically off-set from the horizontal diamond layers in the second portion B.

The Steps of Heating and Pressing the Laminate

The laminate is heated and pressed such that components constituting the laminate are combined with each other, thereby providing the segment. Unlike the powder compact, since the plate-shaped metal matrix has nearly 100% relative density, heating and pressing are performed for combining the plate-shaped metal matrices. Thus, it is not necessary to have the same conditions as those of general sintering.

Combining temperature and pressure supply energy, which enables metal elements on the surface of the plate-shaped metal matrix in one layer to combine with the metal elements on the surface of the plate-shaped metal matrix in different layers. The powder compact requires a great amount of energy in order to combine the metal powders having a size from several μm to several dozen μm.

Compared with sintering, which is generally carried out at a sintering temperature of 700~1,000° C. and a sintering pressure of 350 kg/cm² for 5 minutes, the metal plates can be combined with each other at a lower temperature, a lower pressure and a reduced time in the present invention. The conditions for combining the plate-shaped metal matrices are varied according to not only the kind of the plate-shaped metal matrix but also surface conditions of the metal matrix.

When using a rolled material as the plate-shaped metal matrix, since the melting temperature of the rolled material is lowered and the surface of the plate-shaped metal matrix is cleared without an oxide film or extraneous substances, the combining temperature and pressure are lowered and the time for combining is reduced.

When the metal preforms are inserted between the plate-shaped metal matrices or the powder compact is used as the plate-shaped metal matrix, it is necessary to maintain the temperature and pressure in the range that the metal powders constituting the metal preform and the powder compact can be sintered.

If the diamond particle layers are arranged, some portion of the diamond particles is embedded into the plate-shaped metal matrices during the combining process.

When using the rolled material as the metal matrix, the combining pressure is determined depending on the yield strength of the plate-shaped metal matrix at a high temperature. For instance, as the combining temperature is increased, the yield strength of the plate-shaped metal matrix is lowered, resulting in lowering the combining pressure in inverse proportion to the combining temperature.

When using the hot rolled or cold rolled steel as the plate-shaped metal matrix, the yield strength of the steel is continuously reduced in inverse proportion to the temperature. Finally, the yield strength of the steel at 500° C. is reduced to half of the yield strength at room temperature, and most steel has a yield strength of 50 N/mm² at 800° C. It has been found that at a temperature of 800° C. or more, the diamond particles were sufficiently embedded into the plate-shaped metal matrices with a combining pressure of 350 kg/cm².

As described above, when heating and pressing the laminate, if the metal preforms are inserted, the diamond particles are embedded into the metal preforms or into both the metal preforms and the plate-shaped metal matrices, whereas if the metal preforms are not inserted, the diamond particles are embedded into the metal matrices.

Meanwhile, the present invention provides a cutting tool comprising the segments manufactured as described above.

The present invention will now be described in detail with reference to the examples.

EXAMPLE 1

In order to investigate cutting capability and life span of a cutting tool according to the present invention, a cutting test was conducted for a saw blade (Inventive material 3) manufactured according to the present invention and for the other saw blade (Conventional material 2) manufactured according to the conventional method, and results of the test are shown in Table 2 as follows.

In Table 2, Inventive material 3 was manufactured by laminating four SK85 steel plates, each having a thickness of 0.5 mm, followed by arranging two metal preforms made of 100% Co between the steel plates and arranging a tape with diamond particles uniformly arranged between the metal preforms. Conventional material 2 was manufactured by mixing the diamond particles and the metal powders.

The diamond particles used in Example 1 were MBS 955 available from GE in the U.S.A.

Sintering was performed at a sintering temperature of 950° C. for 5 minutes by hot pressing.

For the cutting test, twenty-four segments manufactured as described above were attached to a steel core having a length of 14 inches by laser welding, and the cutting test was carried out by cutting concrete, granite, and washed concrete, respectively.

The saw blade used in the test was a 14 inch-type Table Saw manufactured by EDCO Corporation, and the RPM was 3,500.

Each of the segments had dimensions of 40 mm diameter, 8.2 mm width and 3.2 mm thickness.

TABLE 2

| Sample No. | Shape of matrix | Cutting feed rate (cm²/min) | | |
|---|---|---|---|---|
| | | Concrete | Granite | Washed Concrete |
| Inventive material 3 | Plate-shaped metal matrix | 829 | 577 | 745 |
| Conventional material 2 | Powder | 756 | 461 | 464 |

As shown in Table 2, it can be appreciated that Inventive material 3 manufactured according to the present invention has an excellent cutting capability, compared with Conventional material 2 manufactured according to the conventional method.

EXAMPLE 2

Figure 10:
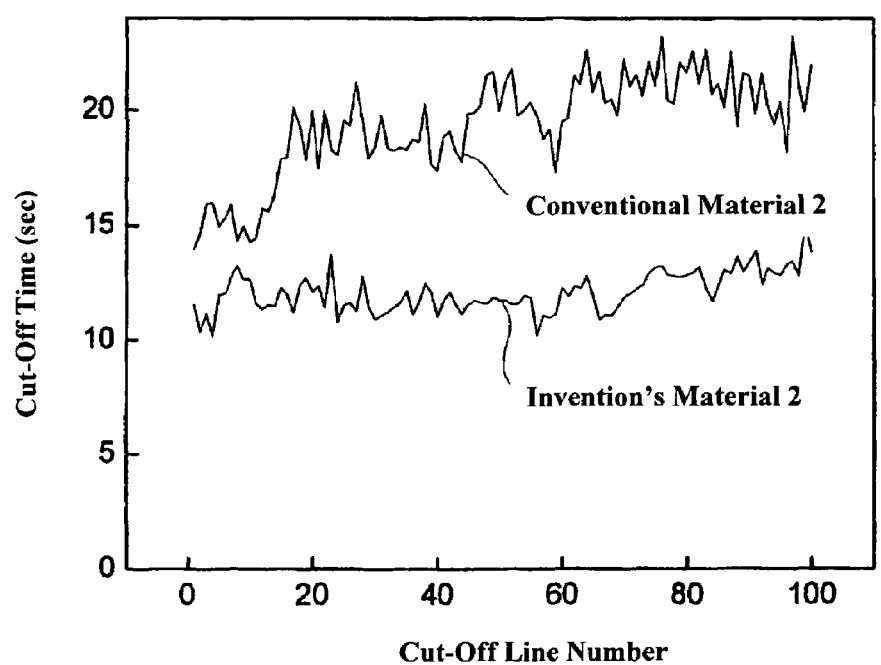
FIG. 10 is a graphical representation depicting cutting time according to the number of cutting cycles in saw blades, one of which comprises the segments manufactured by the present invention and the other of which comprises the segments manufactured by the conventional method.

Changes in cutting time depending on the number of cutting cycles were investigated by a cutting test on the washed concrete using the saw blades of Inventive material 3 and Conventional material 2 of Example 1, and results of the test are shown in FIG. 10.

The term "cutting time" means the time taken for the saw blade to cut a workpiece one time in a cutting operation. The term "cutting one time" means that the workpiece having a length of 30 cm is cut one time in a predetermined depth.

As shown in FIG. 10, it can be appreciated that the saw blade of Inventive material 3 has a more reduced cutting time, a more stable tendency of the cutting time, and a more uniform capability than the saw blade of Conventional material 2.

As is apparent from the above description, according to the present invention, there are advantageous effects in that as the plate-shaped metal matrices are used instead of the powdered matrices when manufacturing the cutting segment, manufacturing costs are reduced, resulting in reduced product costs, and the processes of mixing metal powder, granulating and forming can be omitted, simplifying the manufacturing process, thereby remarkably enhancing productivity.

Further, there are advantageous effects in that as the plate-shaped metal matrices are used instead of the powdered matrices when manufacturing the segment, the diamond particles can be uniformly distributed, so that the segment is excellent in cutting capability and life span.

It should be understood that the embodiments and the accompanying drawings as described above have been described for illustrative purposes and the present invention is limited only by the following claims. Further, those skilled in the art will appreciate that various modifications, additions and substitutions are allowed without departing from the scope and spirit of the invention as set forth in the accompanying claims.

What is claimed is:

1. A cutting segment comprising:
a plurality of layers, each of the layers including a plate-shaped sintered layer and a plate-shaped metal layer, the plate-shaped sintered layer and the plate-shaped metal layer being alternately positioned such that the plate-shaped sintered layer and the plate-shaped metal layer are positioned perpendicular to a cutting surface of the segment and parallel to a cutting direction of the segment; and
diamond particle layers arranged such that at least a portion of the diamond particles are positioned in the sintered layer and the remainder of the diamond particles are positioned in the plate-shaped metal layer while being provided as an array of the diamond particles on the cutting surface.

2. The cutting segment as set forth in claim 1, wherein each of the plate-shaped metal layer has a thickness such that the thickness of the plate-shaped metal layer is at maximum twice the thickness of the diamond particle layer.

3. The cutting segment as set forth in claim 1 or 2, wherein each of the plate-shaped metal is made of a material selected from the group consisted of steel, aluminum alloy, nickel alloy, copper alloy, and brass.

4. The cutting segment as set forth in claim 3, wherein each of the plate-shaped metal layers is made of rolled material, sintered material, or a combination of the rolled material and sintered material.

5. The cutting segment as set forth in claim 4, wherein each of the plate-shaped metal layers is made of rolled material, sintered material, or a combination of rolled material and sintered material, together with some portion of metal powder compact.

6. The cutting segment as set forth in claim 4 or 5, wherein the rolled material is a hot rolled steel plate or a cold rolled steel plate.

7. The cutting segment as set forth in claim 1 or 2, wherein each of the plate-shaped metal layers is made of a rolled material, a sintered material, or a combination of rolled material and sintered material.

8. The cutting segment as set forth in claim 7, wherein each of the plate-shaped metal layers is made of rolled material, sintered material, or a combination of rolled material and sintered material, together with some portion of metal powder compact.

9. The cutting segment as set forth in claim 8, wherein the rolled material is a hot rolled steel plate or a cold rolled steel plate.

10. The cutting segment as set forth in claim 7, wherein the rolled material is a hot rolled steel plate or a cold rolled steel plate.

11. The segment as set forth in claim 1, which comprises a leading portion with n layers of diamond particles, and a trailing portion with n' layers of diamond particles where n'≦n, and
wherein the leading portion and the trailing portion are alternately arranged in the segment, such that the layers of diamond particles on the trailing portion are arranged between the layers of diamond particles on the leading portion in a cutting direction.

12. The segment as set forth in claim 11, wherein the layers of diamond particles in the leading portion are arranged between the layers of diamond particles in the trailing portion, respectively, by forming depressed portions to both sides of the segment in the cutting direction.

13. The segment as set forth in claim 11, wherein the leading portion of diamond particles are spaced from each other by a distance less than or equal to the thickness of each trailing portion of diamond particles.

14. The segment as set forth in claim 11, further comprising fillers distributed therein at a portion where the layers of diamond particles are not formed.

15. The segment as set forth in claim 14, wherein the fillers are selected from the groups consisting of SiC, WC, BN, $Al_2O_3$, diamond particles, and mixtures thereof.

16. The segment as set forth in claim 14, wherein the fillers are the diamond particles, and the diamond particles added as the fillers to the segment have a concentration of 10~60% of the concentration of the diamond particles for the cutting operation in the segment.

17. A cutting tool comprising cutting segments according to any one of claims 1 and 11.

18. A cutting segment according to claim 1, wherein said diamond particles are arranged in a non-random pattern.

* * * * *